United States Patent [19]

Auñon et al.

[11] Patent Number: 5,537,093
[45] Date of Patent: Jul. 16, 1996

[54] ELECTROOPTICAL LINE MODULE FOR TRANSMITTING IN LEVEL-1 SYNCHRONOUS DIGITAL HIERARCHY WITH SYNCHRONIZING UNIT

[75] Inventors: Jesus M. Auñon; Luis C. Garcia, both of Madrid, Spain

[73] Assignee: Telefonica De Espana, S.A., Madrid, Spain

[21] Appl. No.: 238,053

[22] Filed: May 4, 1994

[30] Foreign Application Priority Data

May 7, 1993 [ES] Spain .................................. 9300979

[51] Int. Cl.$^6$ ............................. G08B 1/00; H04B 10/00
[52] U.S. Cl. ........................ 340/531; 340/555; 340/557; 359/109; 359/143; 359/152; 359/158; 359/177
[58] Field of Search ........................... 340/531, 555–557; 359/109, 110, 143, 152, 154, 158, 164, 167, 177

[56] References Cited

U.S. PATENT DOCUMENTS 4,857,727  8/1989  Lenz et al. ............................. 359/143
5,136,410  8/1992  Heiling et al. ......................... 359/110

Primary Examiner—Donnie L. Crosland
Attorney, Agent, or Firm—Popham, Haik, Schnobrich & Kaufman

[57] ABSTRACT

An electrooptical line module for transmitting in Level-1 Synchronous Digital Hierarchy with a synchronizing unit that includes a single line module on a single printed circuit and components capable of performing transmission, reception, recovery and clock and alarm synchronization functions. The line module includes a subunit capable of converting an input electrical signal received by the module into an optical signal to be transmitted via fiber optics.

6 Claims, 2 Drawing Sheets

5,537,093

ELECTROOPTICAL LINE MODULE FOR TRANSMITTING IN LEVEL-1 SYNCHRONOUS DIGITAL HIERARCHY WITH SYNCHRONIZING UNIT

The present specification refers to a patent of invention related to an electrooptical line module for transmitting in Level-1 Synchronous Digital Hierarchy with a synchronizing unit, the purpose of which is to receive and transmit data via fiber optics of a synchronous digital hierarchy, acting also to synchronize the system clocks, all this being included in a sole line module with circuits which are necessary for performing the above-mentioned functions.

FIELD OF THE INVENTION

This invention applies to telecommunications, and specifically, wideband communications systems through fiber optics.

RELATED ART

Prior to the development of wideband systems, the digital communications were based on a plesiocronous digital hierarchy, characterized in the non-existence of synchronization between different data affluents of each level of hierarchy.

In order to cut down the costs of multiplexing equipment, a synchronous digital hierarchy was introduced, the main feature of which is the need for synchronizing different affluents of each hierarchy.

The above implies the need for introducing into the equipment several systems destined to synchronize clocks.

On wideband equipment, a lot of information is generated, for which the most suitable transmission means is the optical fiber because of its high capacity; the transmission systems incorporate functions such as to receive, transmit, recover clocks and synchronize clocks.

There are, at present, several systems incorporating all these functions, that all operate with independent circuit-cards. However, these solutions present a series of problems such as the interconnection for high speed data, apart from utilizing large areas for printed circuits, which means high costs of equipment.

There is a general trend to achieve systems incorporating several functions of this type in a single module, although there is no known module in the market capable of performing all of the functions.

An evident solution to this problem would be to rely on an element joining in a sole unit all the above-mentioned functions, to achieve an improved system and solve the technical problems discussed above.

Nevertheless, up until now nothing is known about the existence of an invention providing those characteristics.

SUMMARY OF THE INVENTION

The electrooptical line module for transmitting in Level-1 Synchronous Digital Hierarchy with a synchronizing unit as proposed by this invention constitutes, per se, an evident solution to the present problems on this matter, and it is an improvement and solution to the posed technical problems. The invention makes, it possible to gather in a sole line module all appropriate circuits for transmitting and receiving data via an optical fiber in a synchronous digital hierarchy, contributing at the same time to synchronize the clocks in the system. In a more evident manner, the electrooptical line module for transmitting in Level-1 Synchronous Digit Hierarchy with synchronizing unit is constructed on a printed circuit in which several components capable of performing transmission, reception, clock recovery and clock and alarm synchronization functions are integrated.

The transmission function is performed in a subunit which converts an input electrical signal to the module into an optical signal to be transmitted via optical fiber.

The input electrical data signal consists of a sequence of data with NRZ code at a basic speed in a synchronous digital hierarchy (155.520 mb/s) and ECL differential logic levels, from a wideband equipment.

The output optical signal is a laser light of modulated intensity.

The electrical signal passes to a laser excite the function of which is to module in intensity a laser emitter, there being a control link for maintaining an average optical power emitted at the desired level.

The use of a Pelter cooler has been omitted from the laser cooling system, with a resulting improvement with regard to energetic consumption reduction.

The laser can be turned off during periods when no data transmission is made.

The reception function is performed by a subunit the task of which is to convert an optical signal received through the input optical fiber into an electrical signal.

The input signal received through the optical fiber includes of an intensity modulated laser beam, which is transmitted at the basic speed of the synchronous digital hierarchy, and transformed in the receiving subunit in order to obtain an output electrical data signal in NRZ code and ECL differential logic levels.

The optical-electrical conversion is attained by a direct detection, from the utilization of a PIN diode.

The signal so obtained is amplified by a low noise preamplifier, and then it is amplified until obtaining an adequate output level.

The clock recovery function is carried out on the output signal from the receiving subunit, extracting a clock signal of 155.520 Mhz starting from the input data and timing these again.

The subunit for recovering the clock obtains, at the output, these retemporized data and the recovered clock, delivering these data in NRZ code and ECL differential levels.

If an alarm signal is enabled by loss of optical power, the data output in this submodule is blocked.

The generating and clock synchronizing function is carried out by means of a circuit based on a Phase Locked Loop (PLL), which generates a 155.520 Mhz clock from three different sources, that is to say:

A 155.920 Mhz recovered clock.

A 128 Khz input clock.

A 2.048 Mhz input clock.

The submodule delivers, at the output, a clock signal genera
ted in ECL differential levels.

The invention relies on a subunit performing an alarm function,
consisting of giving general information on the module status, by processing the following three possible alarms:

An alarm referred to the transmission subunit, produced when the laser has degraded its operating mode.

An alarm corresponding to the receiving unit due to the loss of optical power in reception, related to a breaking or an excess reduction of power in the optical fiber.

An alarm which is enabled when any of the other two above-mentioned alarms are activated.

BRIEF DESCRIPTION OF THE DRAWINGS

In order to complement this description and to aid to a better understanding of the features of the invention, the accompanying drawings, which are a part of this specification, show in an illustrative illustrative but non limitative sense, the following.

DETAILED DESCRIPTION OF THE PREFERRED EMBODIMENT

Figure 1:
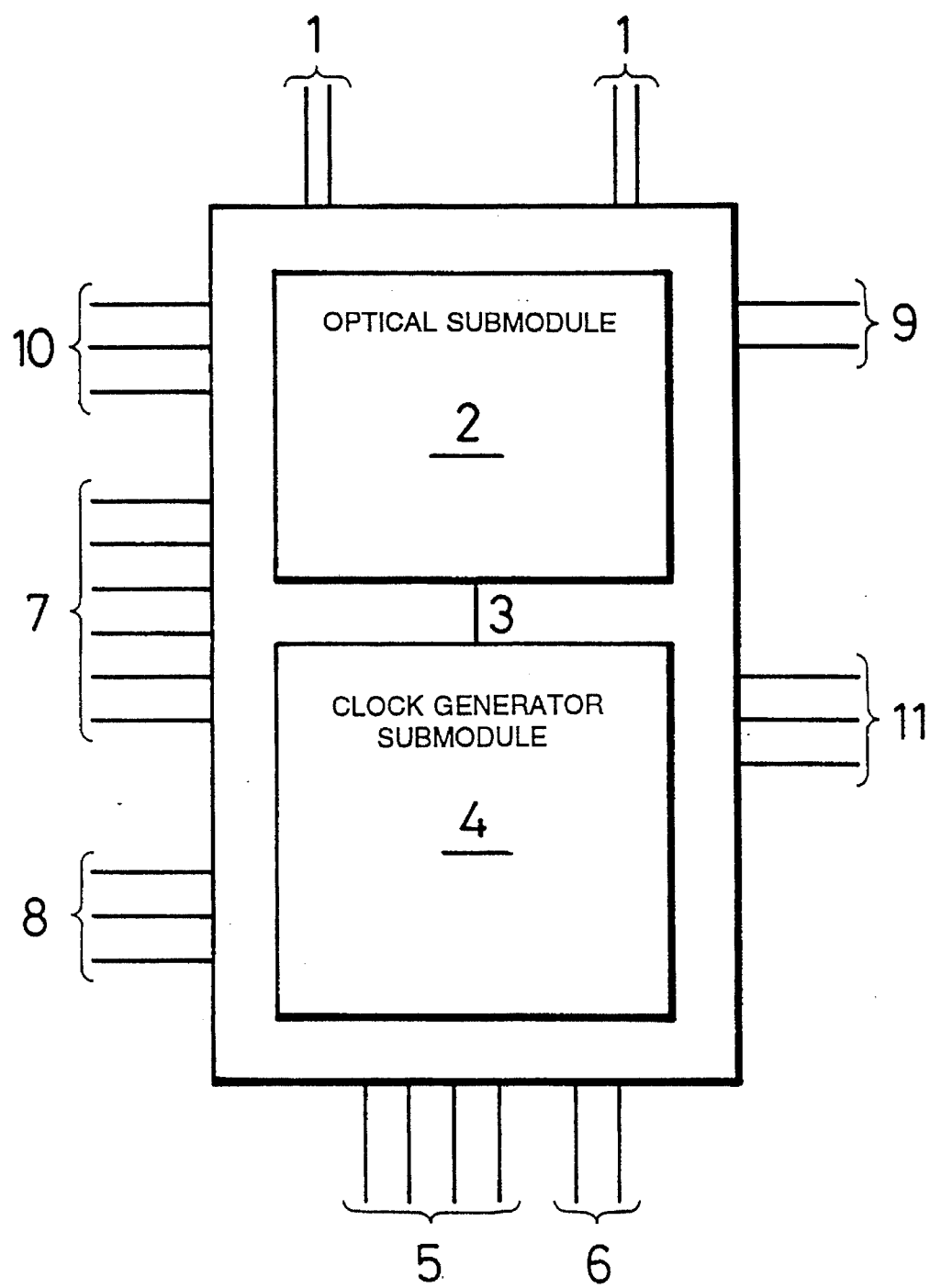
FIG. 1 shows a general diagram of the electrooptical line module for transmitting in Level-1 Synchronous Digital Hierarchy with a synchronizing unit, which is the object of this invention, in which it can,be seen the two fundamental blocks integrating it, that is to say optical submodule and clock generator, as well as their external interfaces and feeding voltages.

From these figures, and specifically from FIG. 1, it can be seen the general diagram of the electrooptical line module, as well as its input and output interfaces.

The optical signals are transmitted and received through respective monomode optical fibers (1), acceding directly to an optical submodule (2) in which the electrooptical conversion is performed.

The clock generator submodule (4) generates a clock signal and synchronizes signals, the recovered clock signal (3) being received in this clock generator submodule (4) through the optical submodule, to which the corresponding clock signals are added in order to obtain the system clock signals (6).

The clock generation is performed by using, in addition to the signal supplied by the optical submodule (2), clock signals of external reference (11)

At the output, the module delivers output data signals (5) and system clock signals (6).

The module is completed with different feeding inlets (7), control signals (8), electrical input and output data signals and alarm signals (10).

Figure 2:
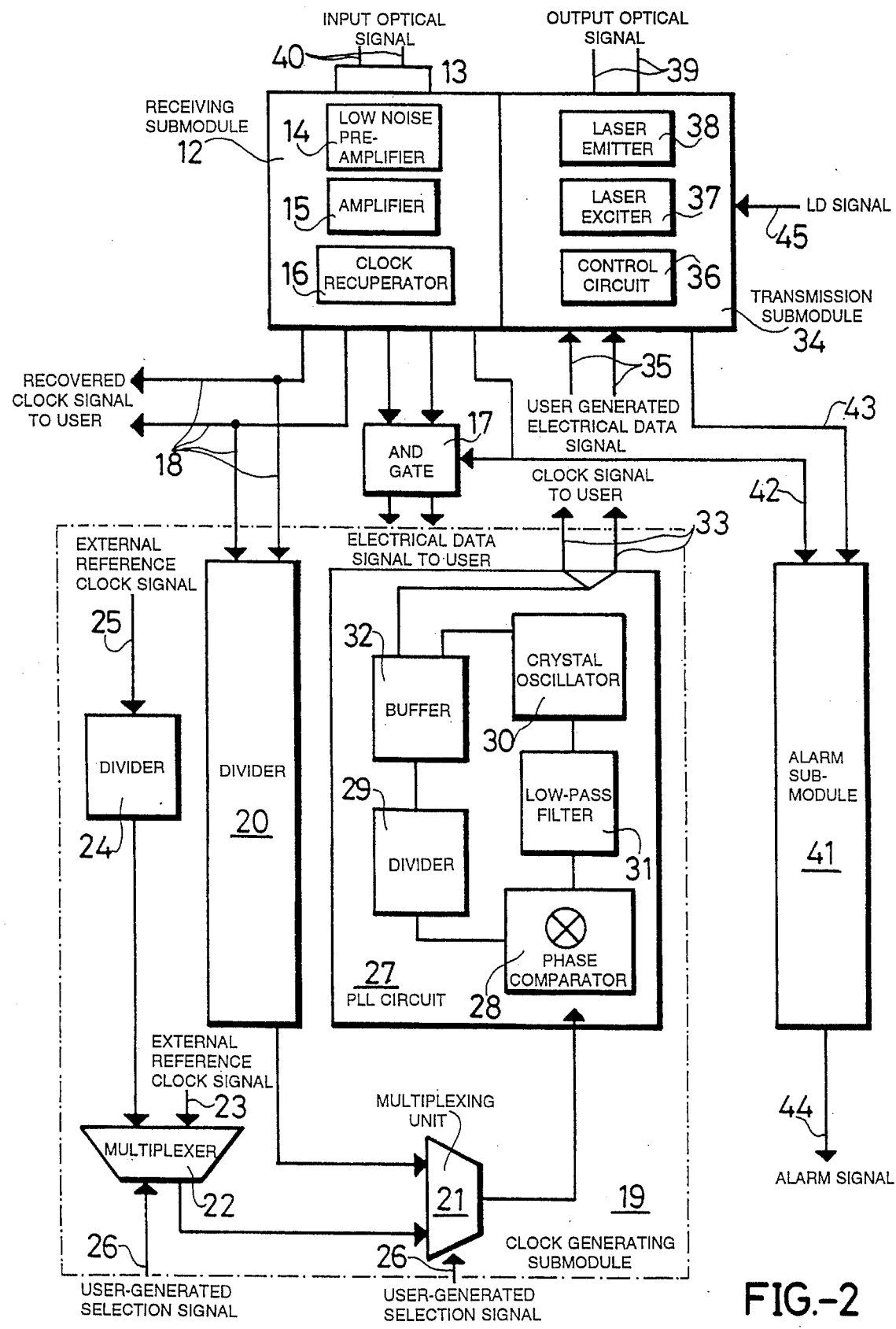
FIG. 2 shows a block diagram of the line module, in which it can be seen the elements which make up the subunits of the module.

FIG. 2 shows the different elements composing the line module. An input optical signal (40) arrives at the receiving submodule (12) through an input detecting PIN diode (13), which delivers it to a low noise preamplifier (14), said signal passing, after completing this step, to an amplifier (15) until obtaining the output level, this being the moment in which it is transmitted to a clock recuperator (16) which extracts the 155.520 Mhz clock starting from the input data, and times them again.

The receiving submodule (12) delivers electrical data signals to an AND gate (17), which delivers lastly the output electrical data to a user.

Outputs of recovered clock (18) pass both to a user and a clock generating submodule (19).

The clock generating submodule (19) receives the clock signal recovered in a divider (20) which divides it between 1215, and delivers it to a multiplexing unit (21), this same unit receiving clock signals from the external clocks of reference, which have been multiplexed by a multiplexer (22) respectively; that of the clock of reference of 128 Khz (23) being direct, while the 2.048 Mhz clock signal (25) passing previously through a divider (24), which divides it between 16.

The control of the clock signal selection is directed through selection signals (26) generated by a user.

The clock signal is delivered to a PLL circuit (27), where a phase comparator (28), a divider (29), a crystal oscillator controlled by voltage (30), a low-pass filter (31) and a buffer (32) are located, the latter delivering, lastly, the clock signal generated by a system (33) to a user.

A transmission submodule (34) receives the electrical input data signals (38) from a user.

In this submodule, input signals are received by a laser exciter (37), which controls the sending of signals by a laser emitter (38) that after passing through said laser emitter (38) are sent to the output of the line module.

The invention contemplates the existence of a control circuit (36), the function of which is to keep the average optical power emitted.

The transmission submodule (34) delivers, at the output, an optical signal (39), shaped like an intensity modulated laser light.

The transmission module (34) receives an LD signal (45) turning off the laser (38) during long periods of time when no data is transmitted, to prevent aging of the module.

Start signals from both the receiving submodule (12) and from the transmission module (34) are addressed to an alarm submodule A receiving alarm (42) is enabled when a loss of optical power in reception is produced, due to a breaking or an excess reduction of power in the input optical fiber (40)

A transmission alarm (43) is produced when the laser (38) experiences excess aging.

In addition to said two alarms, an alarm submodule (41) generates a third alarm (44) warning that one of said two alarms has been generated.

It is not considered necessary to extend more this description for an expert in the art to understand the scope of the invention and the advantages derived from it.

The materials, shape, size and arrangement Of the components are open to variation, provided that it does not imply any alteration to the essence of the invention.

The terms under which this specification has been described should be always taken in an ample and non-limiting sense.

We claim:

1. An electrooptical line module for receiving, converting and transmitting optical and electrical data signals comprising:

a receiving submodule for receiving an optical signal, converting said optical signal to an electrical data signal, delivering said electrical data signal to a user and generating a recovered clock signal;

a clock generating and synchronizing submodule for receiving said recovered clock signal from said receiving submodule, for receiving a clock selection signal from said user, for receiving an external reference clock signal, for synchronizing said recovered clock signal from said receiving submodule, said clock selection signal from said user and said external reference clock signal to generate a synchronized clock signal, and transmitting said synchronized clock signal to said user; and a transmitting submodule for receiving an electrical data signal from said user, converting said electrical data signal to an output optical signal and transmitting said output optical signal to an optical fiber;

wherein the electrooptical line module performs optical and electrical signal receiving, converting and transmitting functions at a basic speed of Synchronous Digital Hierarchy (155.530 Mhz), and a clock synchronizing function for wideband communications systems.

2. An electrooptical line module according to claim 1, wherein said transmitting submodule comprises a laser that turns off when no data is emitted.

3. An electrooptical line module according to claim 1, wherein said recovered clock signal is transmitted both to a user and said clock generating an synchronizing submodule.

4. An electrooptical line module according to claim 1, further comprising an alarm submodule for generating an alarm when there is a fall in input optical power, wherein said receiving submodule blocks data output through an AND gate when an alarm is generated by said alarm submodule due to a fall in input optical power.

5. An electrooptical line module according to claim 1, wherein said clock generating and synchronizing submodule synthesizes a clock at a transmitting speed of 155.520 Mhz.

6. An electrooptical line module according to claim 2, further comprising an alarm submodule for generating a first alarm when said laser experiences excess aging, a second alarm when the power of the input optical signal falls under a certain threshold, and a third alarm when either said first or said second alarm is generated.

* * * * *